United States Patent [19]

Mori et al.

[11] Patent Number: 4,947,464
[45] Date of Patent: Aug. 7, 1990

[54] HEATING COIL ASSEMBLY FOR AN ELECTROMAGNETIC INDUCTION COOKING ASSEMBLY

[75] Inventors: Masaya Mori; Kazunobu Kihira, both of Nagoya, Japan

[73] Assignee: Sumitomo Electric Industries, Ltd., Osaka, Japan

[21] Appl. No.: 150,281

[22] Filed: Jan. 29, 1988

Related U.S. Application Data

[62] Division of Ser. No. 938,403, Dec. 5, 1986, Pat. No. 4,770,355.

[30] Foreign Application Priority Data

Dec. 7, 1985 [JP] Japan .................. 60-275583
Jan. 8, 1986 [JP] Japan .................. 61-2627

[51] Int. Cl.$^5$ ............................ H05B 6/40
[52] U.S. Cl. ................... 219/10.79; 219/10.493; 336/208; 336/224; 336/232
[58] Field of Search ............ 242/7.02, 7.11, 7.12, 242/7.09, 7.07, 7.03; 29/605, 606; 219/10.79, 10.491, 10.493, 10.67; 336/232, 224, 207, 136, 208

[56] References Cited

U.S. PATENT DOCUMENTS

| | | | |
|---|---|---|---|
| 1,825,105 | 9/1931 | Terman | 336/207 |
| 2,621,324 | 12/1952 | Wen Yuan Pan | 336/224 X |
| 3,113,280 | 12/1963 | Hobley | 336/136 X |
| 3,275,784 | 9/1966 | Merrett | 219/10.79 |
| 3,368,174 | 2/1968 | Fischer | 336/199 X |
| 3,372,470 | 3/1968 | Bindari | 29/605 X |
| 3,504,474 | 4/1970 | Dykmans | 242/7.02 X |
| 3,635,411 | 1/1972 | Petrinjak et al. | 242/7.11 X |
| 3,703,601 | 11/1972 | Babel | 219/10.491 X |
| 3,843,857 | 10/1974 | Cunningham | 219/10.493 |
| 3,996,442 | 12/1976 | Moreland, II et al. | 29/10.79 |
| 4,029,926 | 6/1977 | Austin | 219/10.79 X |
| 4,453,067 | 6/1984 | Karklys et al. | 336/232 X |

FOREIGN PATENT DOCUMENTS

| | | | |
|---|---|---|---|
| 45-38313 | 7/1967 | Japan | 336/224 |
| 56-743 | 5/1981 | Japan . | |

Primary Examiner—Thomas J. Kozma
Attorney, Agent, or Firm—Cushman, Darby & Cushman

[57] ABSTRACT

In a method of manufacturing a heating coil assembly for electromagnetic induction cooking heater in which a coil supporting base and a flat shaped coil winding frame are mounted on the spindle of a coil winding machine in such a manner as to form a coil receiving space therebetween, and a wire is wound in the space to form a coil, the coil supporting base and/or the coil winding frame has protrusions which extend in the space at the middle part, to vary the coil winding pitch, whereby the coil thus formed has a gap at the middle part, thus showing a uniform temperature distribution when energized.

7 Claims, 6 Drawing Sheets

HEATING COIL ASSEMBLY FOR AN ELECTROMAGNETIC INDUCTION COOKING ASSEMBLY

This is a division of application Ser. No. 938,403, filed Dec. 5, 1986, now U.S. Pat. No. 4,770,355.

BACKGROUND OF THE INVENTION

This invention relates to heating coil assemblies for electromagnetic induction cooking heater, and methods for manufacturing the heating coil assemblies, more particularly, to heating coil assemblies having larger coil winding pitch at the middle part between the outer and inner circumferential parts thereof and methods for manufacturing the same.

An electromagnetic induction cooking heater comprises a heating coil assembly. The coil assembly is generally manufactured as follows: As shown in FIGS. 11 and 12, a Litz wire 3 consisting of a number of separately insulated strands of enameled wires is wound spirally and secured to a coil supporting base 2 with varnish. More specifically, as shown in FIG. 5, the coil supporting base 2 and a coil winding frame 1 are fixedly mounted on the shaft of a coil winding machine in such a manner that a space for receiving the Litz wire 3 is formed therebetween, and then the Litz wire 3 is spirally wound in the space. The coil manufacturing method is advantageous in that the number of manufacturing steps is relatively small and the productivity is high.

However, in the heating coil assembly manufactured according to the above-described conventional coil manufacturing method, the Litz wire is uniformly and closely wounded as is apparent from FIG. 11, thus providing the following difficulty: When the heating coil is energized, the middle part of the heating coil, located between the inner and outer parts thereof becomes higher in magnetic flux density than any other parts. Therefore, when a cooking utensil to be heated, such as a pan, is placed over the heating coil, its part confronting the middle part of the heating coil is heated more than the other parts. This phenomenon may result in the difficulty that, especially in preparing food by baking, the food is nonuniformly baked.

In order to eliminate the difficulty, a method has been proposed in the art in which the coil winding pitch is made smaller towards the outer periphery of the coil (cf. Japanese Patent Application Laid-Open No. 56743/1981). However, the method is low in productivity and high in manufacturing cost, because it is necessary to prepare a plastic spacer for manufacture of each coil and the wire is wound on the spacer.

SUMMARY OF THE INVENTION

In view of the foregoing, an object of this invention is to provide a heating coil assembly in which the coil wound spirally has a gap at its middle part which is located between the outer and inner parts of the coil, thereby to eliminate the above described difficulties accompanying a conventional heating coil assembly.

Another object of the invention is to provide a method of manufacturing the above-described heating coil assembly with high productivity.

The foregoing objects and other objects of the invention have been achieved by the provision of a coil assembly which, according to the invention, comprises: a flat shaped coil support base; and a coil formed on the coil base by spirally winding a stranded wire in such a manner that a gap is formed in the coil at the middle part thereof, and by the provision of a coil assembly manufacturing method in which a flat shaped coil support base and a flat shaped coil winding frame are fixedly mounted on the output shaft of a coil winding machine in such a manner that the coil base and the coil winding frame define a coil receiving space, and a stranded wire is wound spirally in the space to form a coil therein, in which, according to the invention, the coil base and/or coil winding frame has a plurality of protrusions which extend in the space at the middle part, which is located between the outer and inner peripheries of the space, thereby to change the coil winding pitch.

The nature, utility and principle of the invention will become more apparent from the following detailed description and the appended claims when read in conjunction with the accompanying drawings.

DETAILED DESCRIPTION OF THE INVENTION

Preferred embodiments of this invention will be described with reference to the accompanying drawings.

Figure 1:
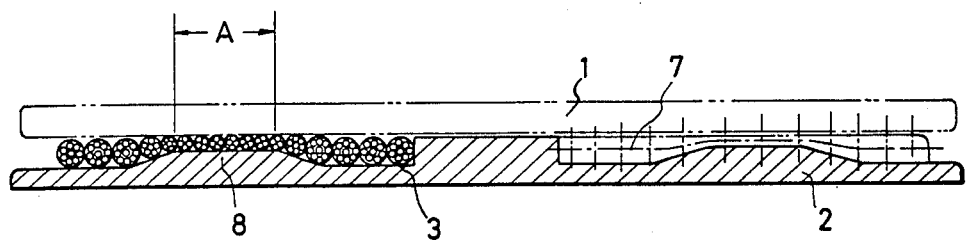
FIGS. 1 and 2 are a sectional view and a perspective view, respectively, showing a first example of a heating coil assembly for electromagnetic induction cooking heater which is manufactured according to one example of a heating coil assembly manufacturing method of the invention.
Figure 2:
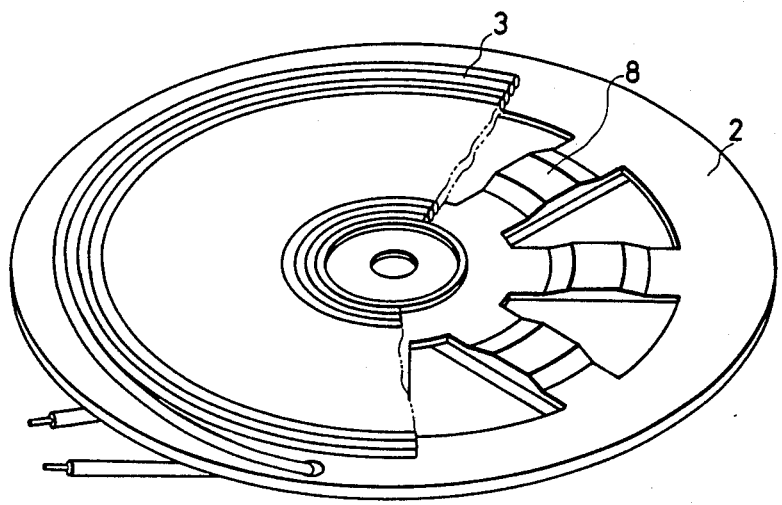

A first example of a heating coil assembly for electromagnetic induction cooking heater according to the invention, as shown in FIGS. 1 and 2, comprises: a coil supporting base 2 having protrusions 8 at the middle part thereof; and a spiral coil 3 formed on the coil supporting base 2.

The coil is generally formed as follows: A coil winding frame 1 is placed on the coil supporting base 2, and a stranded wire is spirally wound in the space 7 formed between the coil winding frame 1 and the coil supporting base 2. In this case, the gap between the frame 1 and the base 2 at each of the protrusions 8 of the base 2 is smaller than that at any other part, and therefore, at the protrusions 8, the stranded wire is flattened and its winding pitch is increased as much.

Thus, the winding pitch of the spiral coil can be readily changed according to the method of the invention.

In the present invention, the stranded wire preferably has a stranding pitch which is more than twenty times as large as the outside diameter of the stranded wire. Alternatively, the stranded wire may be a plurality of enameled wires boundled together.

Figure 3:
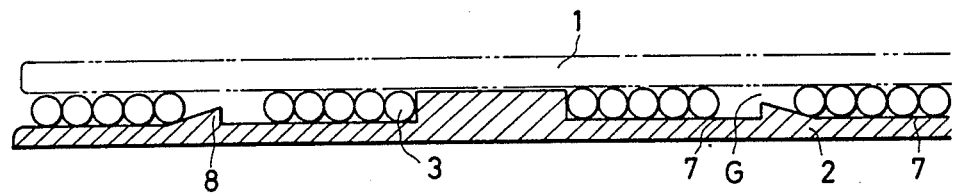
Figure 4:
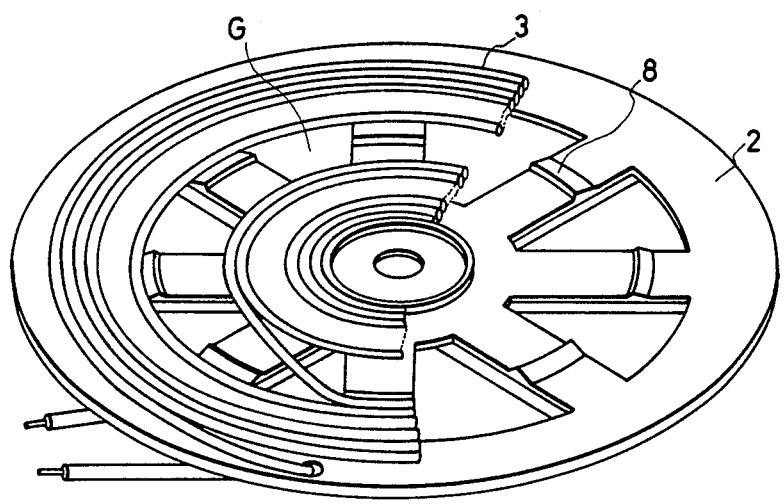
FIGS. 4 are a sectional view and a perspective view, respectively, showing another example of the heating coil assembly which is manufactured according to another example of the heating coil assembly manufacturing method of the invention in such a manner that the coil has a gap at the middle part which is located between the outer and inner peripheral parts of the coil.

FIGS. 3 and 4 show a second example of the heating coil assembly manufactured according to a second example of the coil manufacturing method of the invention. In the heating coil assembly, a gap G is provided at the middle part of a coil 3, between the outer and inner parts.

In the coil manufacturing method, forming the coil 3 is started after, on the wire supplying side, the backward tension given to the wire has been set relatively high.

As a winding machine (not shown) is rotated, a coil supporting base 2 and a coil winding frame 1 mounted on the output shaft of the winding machine are turned so that the stranded wire is wound in the space 7 between the coil supporting base 2 and the coil winding frame 1.

In this operation, since the coil supporting base 2 has protrusions 8 on its upper surface as is shown best in FIG. 3 and the space 7 is made narrower at the protrusions 8, while the backward tension is maintained high the wire is deformed while passing over the protrusions 8, thus being wound along the inner circumference of the space 7.

After the output shaft of the coil winding machine has made a predetermined number of revolutions, the backward tension is decreased so that the wire is prevented from passing over the protrusions 8 and it is wound along the latter 8.

Accordingly, the aforementioned gap G can be readily formed at the middle part of the coil.

Figure 5:
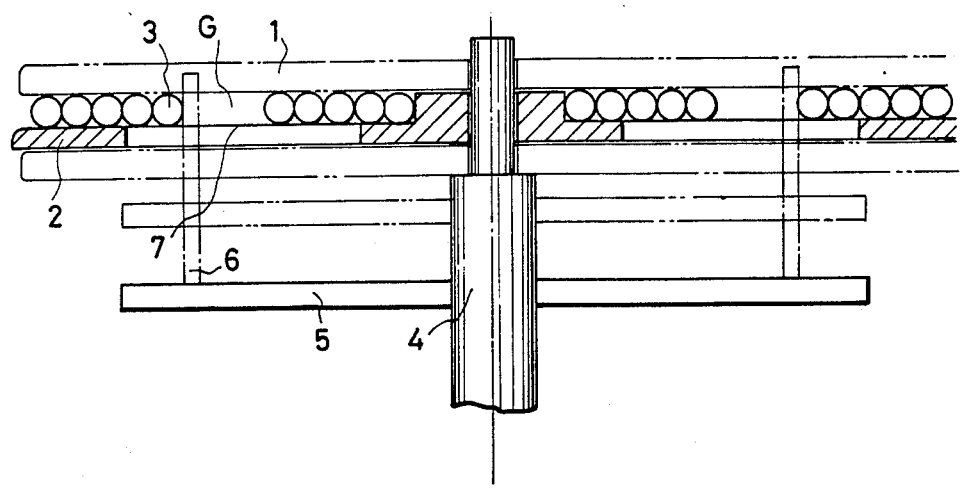
FIGS. 5 and 6 are a sectional view and a perspective view, respectively, showing the same heating coil assembly as that shown in FIGS. 3 and 4 which is now manufactured according to another example of the heating coil assembly manufacturing method of the invention in which spacers are used to form the gap in the coil.
Figure 6:
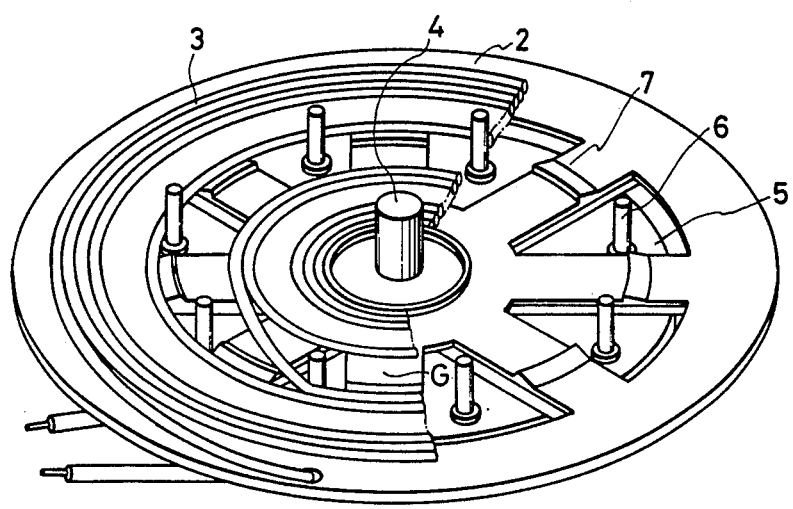

In the above-described method, the heating coil assembly is manufactured by changing the backward tension given to the wire. However, the same heat coil assembly can be manufactured according to a third example of the heating coil assembly manufacturing method according to the invention in which spacers turning in synchronization with the output shaft of a coil winding machine are employed as shown in FIGS. 5 and 6.

More specifically, the spacers 6 are pins which are embedded in a disc 5 in such a manner that they are arranged on a circumference coaxial with the disc 5. The disc 5 is mounted on the output shaft of the coil winding machine.

Forming a coil 3 is started in the same manner as that in the second example of the heating coil assembly manufacturing method shown in FIGS. 3 and 4.

After the coil 3 has had predetermined turns, the spacers 6 are pushed towards the coil 3 together with the disc. Under this condition, the coil winding machine is rotated again. Therefore, the wire is now wound along the spacers 6 to form the outer part of the coil.

Thus, the coil 3 having the gap G at its middle part can be manufactured according to the third example of the heating coil assembly manufacturing method of the invention.

The coil 3 thus formed, the coil supporting base 2 and the coil winding frame 1 are fixedly combined together with screws or the like, and then are removed from the output shaft of the coil winding machine. Thereafter, the coil is bonded to the coil supporting base with adhesive such as impregnating varnish.

Figure 7:
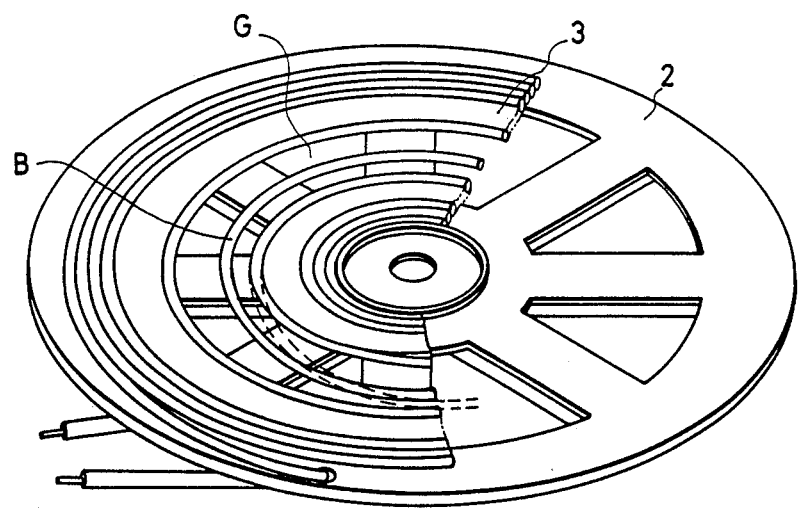
FIG. 7 is a perspective view for a description of the difficulty that, where the coil supporting base has no protrusions, the coil is deformed.

In the above-described operation, when the coil 3, the base 2 and frame 1 are removed from the coil winding machine, simultaneously the spacers 6 for forming the gap G are disengaged from the coil 3. Therefore, the part B of the wire which crosses over the gap (hereinafter referred to "a crossover part or wire B", when applicable) is displaced by the elasticity of the wire itself as shown in FIG. 7; that is, it is difficult to maintain the configuration of the coil unchanged.

The above-described difficulty accompanying the third example of the heating coil assembly manufacturing method can be eliminated by providing protrusions 8 as shown in FIGS. 1 and 2 in such a manner that the protrusions 8 are arranged along the outer periphery of the gap G. That is, the protrusions 8 thus provided prevents the displacement of the crossover wire which otherwise may be caused by the elasticity of the wire. Thus, the heating coil assembly whose coil has a predetermined gap at the middle part can be readily mass-produced.

Figure 13:
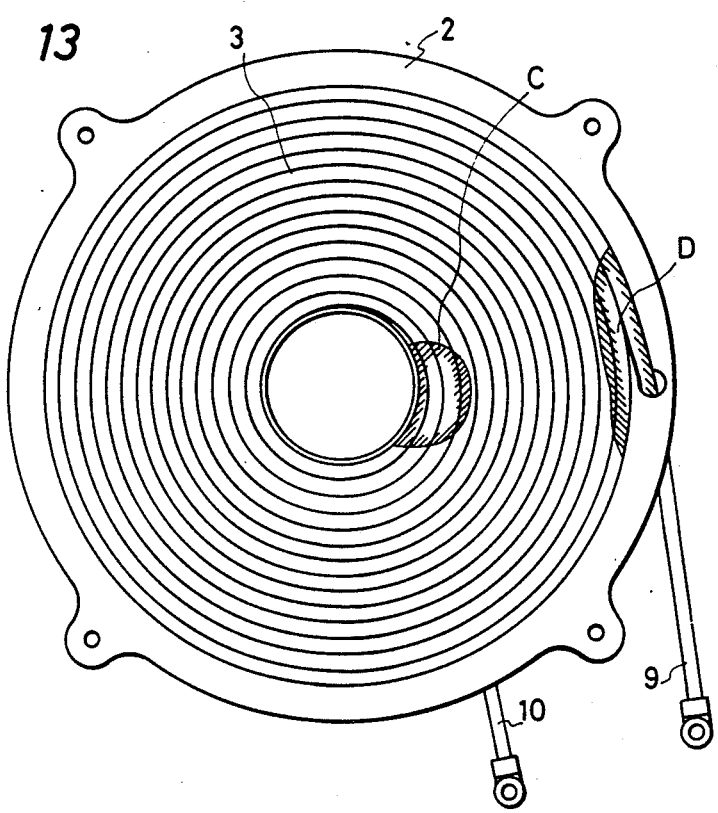
FIG. 13 is a plan view for a description of a method of preventing the permeation of impregnating varnish into the lead wires of the coil.

When the coil is secured to the coil base with impregnating varnish, both end portions C and D (shown in FIG. 13) of the coil are preferably applied with varnish which, at high temperature, is low in fluidity or hardened quickly, whereby permeation of the impregnating varnish into the lead wires connected to the two end portions of the coil is prevented and flexible lead wires are formed In the heating coil assembly of FIG. 1, the coil supporting base 2 has a plurality of protrusions 8 at the middle part. However, it should be noted that the invention is not limited thereto or thereby. That is, the coil supporting base 2 may have only one protrusion 8. In this case also, the protrusion can effectively prevent the displacement of the crossover wire, although the plural protrusions 8 can prevent the displacement of the crossover wire more effectively than the one protrusion.

Figure 9:
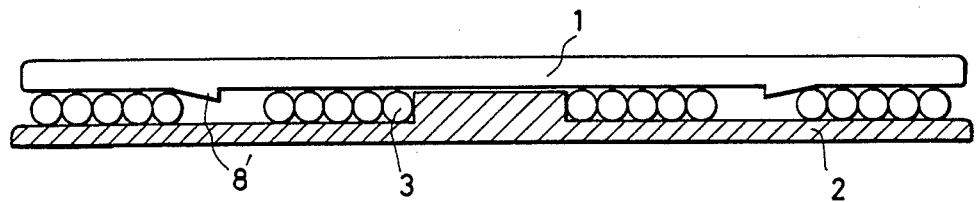
FIG. 9 is a sectional view showing another example of the heating coil assembly manufacturing method of the invention in which the coil winding frame has the protrusions.
Figure 10:
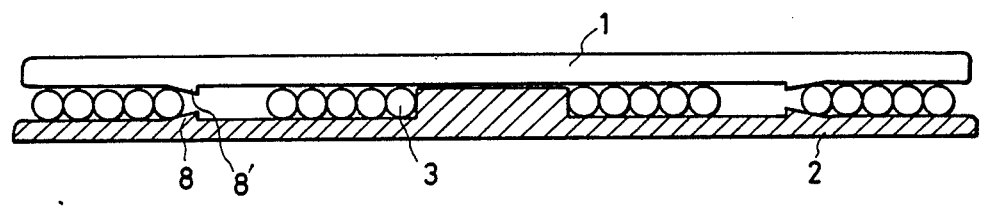
FIG. 10 is a sectional view showing another example of the heating coil assembly manufacturing method of the invention in which the protrusions are formed both on the coil supporting base and on the coil winding frame.
Figure 11:
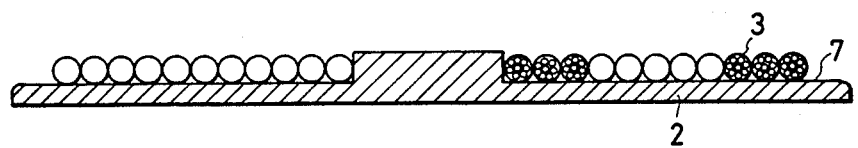
FIGS. 11 and 12 are a sectional view and a perspective view, respectively, showing a conventional heating coil assembly for electromagnetic induction cooking heater.
Figure 12:
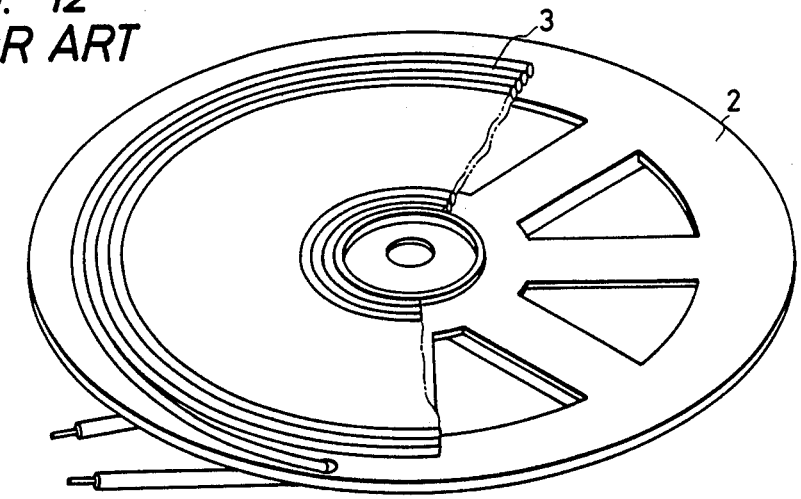

In the above-described heating coil manufacturing methods of the invention, the coil supporting base has the protrusions 8. However, the same effect can be obtained by a method in which protrusions 8' are formed on the coil winding frame as shown in FIG. 9, or protrusions 8 and 8' are formed both on the coil supporting base 2 and on the coil winding frame 1 as shown in FIG. 10. In FIGS. 9 and 10, reference numeral 3 designates the coil formed on the coil supporting base 2.

Figure 8:
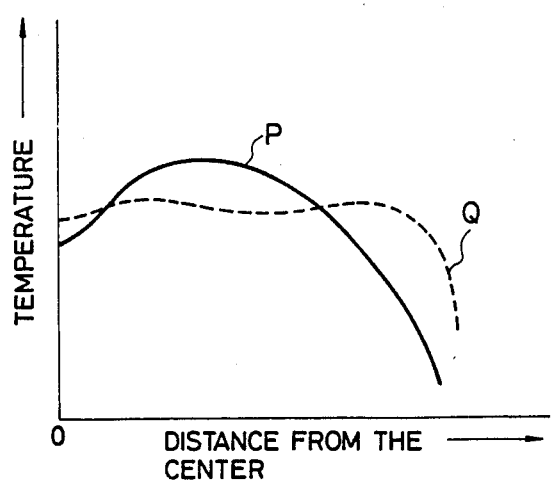
FIG. 8 is a graphical representation for a description of the temperature distribution of the heating coil assembly of the invention in comparison with that of a conventional heating coil assembly.

FIG. 8 is a graphical representation indicating the temperature distribution P of the conventional heating coil assembly and that Q of the heating coil assembly of the invention. It is apparent from FIG. 8 that the heating coil assembly of the invention in which the coil has the gap at the middle part is much uniform in temperature distribution than the conventional heating coil assembly As was described above, according to the invention, the protrusions are formed on the coil supporting base and/or the coil winding frame, whereby the coil winding pitch can be readily changed at the middle part of the coil, between the outer and inner parts. Accordingly, the heating coil assembly for electromagnetic induction cooking heater according to the invention is uniform in heating characteristic.

What is claimed is:

1. A coil assembly comprising:
    a flat shaped coil support base; and
    a spirally wound wire coil on said support base, said wire at a middle part of said coil located approximately halfway between an inner diameter and an outer diameter being flattened relative to the wire at any other part of said coil so that said middle part of said coil is smaller in thickness and larger in coil winding pitch than at any other part of said coil.

2. A coil assembly as in claim 1, wherein said wire coil is a made up of stranded wire.

3. A coil assembly as in claim 2, wherein said stranded wire is made up of a plurality of enameled wire.

4. A coil assembly as in claim 2, wherein said stranded wire has a standing pitch which is more than twenty times as large as the outside diameter of said stranded wire.

5. A coil assembly as in claim 1, wherein said support base further comprises one protrusion at the portion of said support base corresponding to said flattened middle part of said coil.

6. A coil assembly as in claim 1, wherein said support base further comprises a plurality of protrusions at the portion of said support base corresponding to said flattened middle part of said coil.

7. A coil assembly as in claim 1, wherein said wire coil is secured to said support base with impregnating varnish of an epoxy or a polyester, and both end portions of said coil have been applied with varnish which is shorter in hardening time or lower in fluidity than said impregnating varnish to prevent permeation of said impregnating varnish at both of said end portions and to result in flexible lead wires.

* * * * *